UNITED STATES PATENT OFFICE.

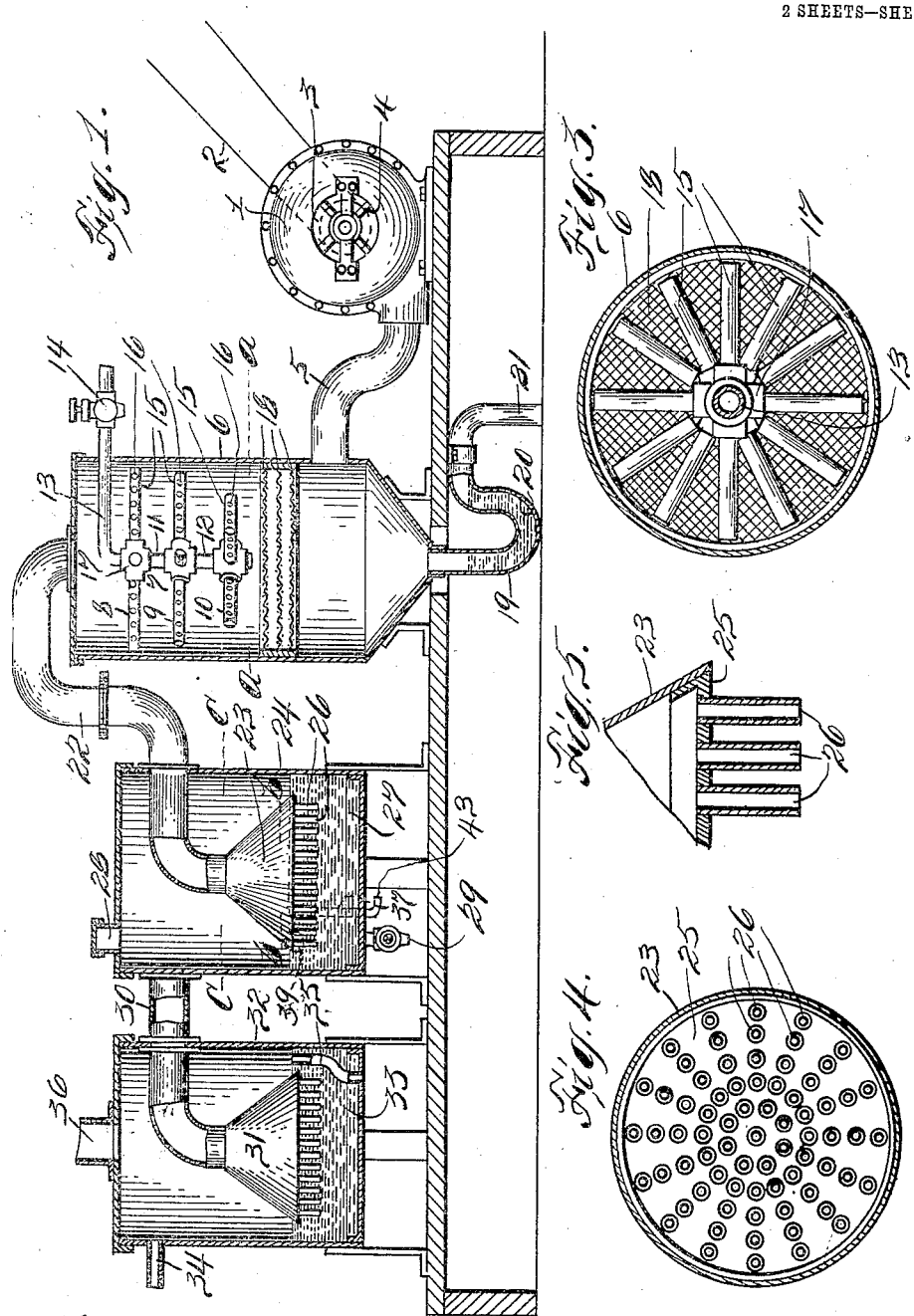

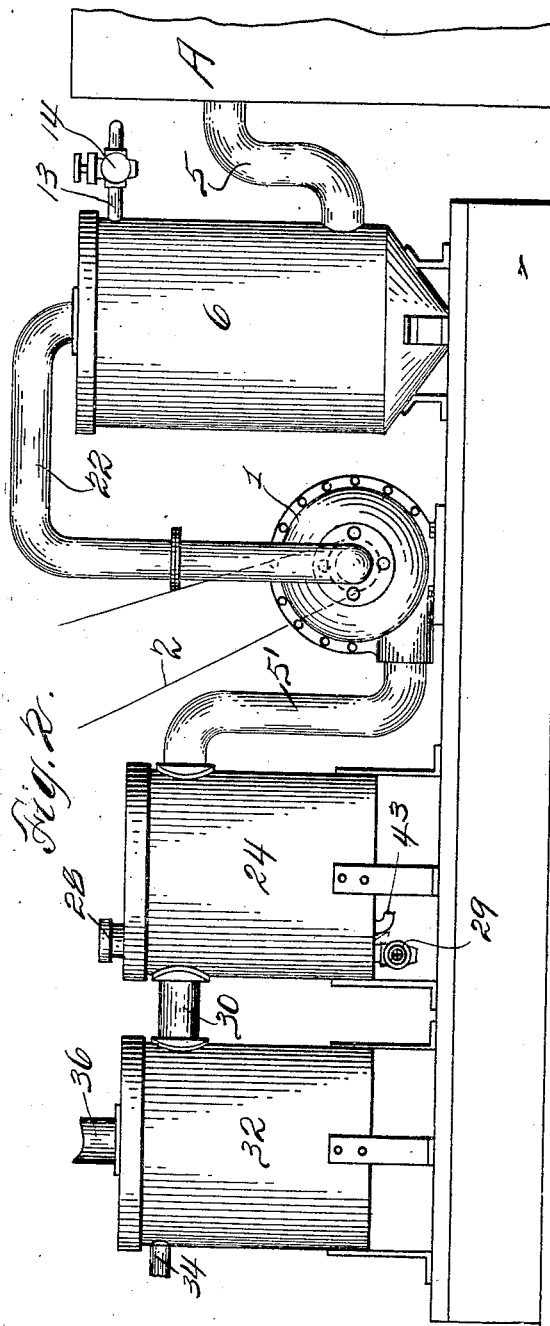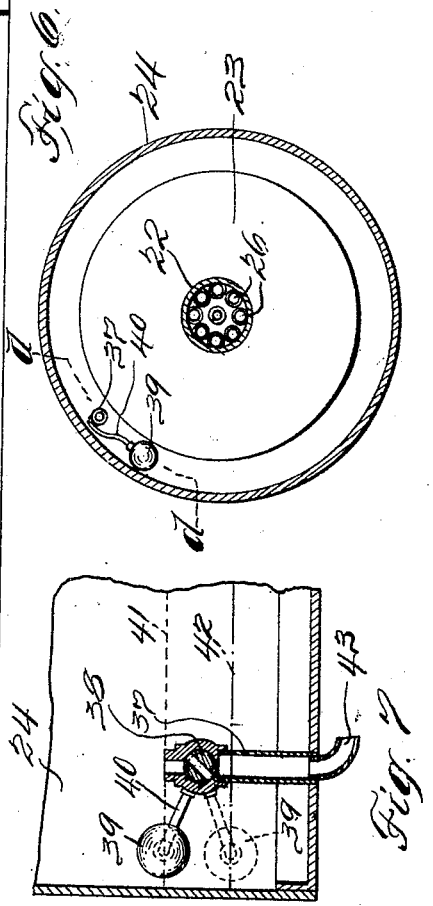

JAMES E. RALSTON, OF NEW YORK, N. Y., ASSIGNOR OF ONE-HALF TO JOHN CAWEIN, OF NEW YORK, N. Y.

DEODORIZING APPARATUS.

No. 862,508.    Specification of Letters Patent.    Patented Aug. 6, 1907.

Application filed September 18, 1906. Serial No. 335,119.

*To all whom it may concern:*

Be it known that I, JAMES E. RALSTON, a citizen of the United States, residing at New York city, Manhattan borough, county and State of New York, have invented certain new and useful Improvements in Deodorizing Apparatus, of which the following is a clear, full, and exact description.

This invention relates to a deodorizing apparatus, the object being to provide a simple and effective apparatus for installation in factories, abattoirs or in any place containing foul or objectionable odors or contaminated air.

To these and other ends which will hereinafter appear, my invention comprises the novel features of improvement and combination and arrangement of parts which I will now proceed to describe and finally claim, reference being had to the accompanying drawings, forming part hereof, wherein—

Figure 1 is a longitudinal central section of a deodorizing apparatus embodying my improvements, the piping and accessories being partly in section and the blower and connecting pipe being in elevation; Fig. 2 illustrates, in side elevation, a modified arrangement of the tanks with respect to the blower; Fig. 3 is an enlarged sectional plan view, the section being taken on a line *a—a* in Fig. 1; Fig. 4 is an enlarged sectional plan view, the section being taken on a line *b—b* in Fig. 1, and shows the perforated plate in the bottom of the distributing funnel; Fig. 5 is an enlarged fragmentary view of the bottom edge of the funnels; Fig. 6 is an enlarged sectional plan view, the section being taken on a line *c—c* in Fig. 1, and shows the automatically controlled inlet-pipe; and Fig. 7 is an enlarged fragmentary vertical sectional view, the section being taken on a line *d—d* in Fig. 6.

Like numerals of reference are intended to indicate corresponding parts in the several views.

Referring to the drawings, the numeral 1 indicates a blower, which is driven by any suitable source of power (not shown) by the belt 2. The blower is of the usual order, the intake being at 3. The air or gases which are drawn in through the opening 3 are forced by the fan 4 of the blower through the pipe 5 and into a saturator 6. Within the saturator 6 I place a spraying device 7, which comprises a plurality of spiders 8, 9 and 10, the same being connected by nipples 11 and 12 and fed by a water-pipe 13, a controlling valve 14 being placed in the pipe 13. As many spiders may be used as desirable. Each of said spiders comprises arms 15 perforated as at 16 with any desired number of holes, the arms being perforated on each side, and said arms are connected to fittings 17, which in turn receive water from the connected pipes, the lowest fitting being plugged at the bottom thereof. By referring to Fig. 3 it will be seen that the spiders 8, 9 and 10 are out of alinement to an extent sufficient to cover or control the area of the saturator tank 6. Between the spraying device 7 and the exhaust-pipe 5 of the blower 1, I place a plurality of obstructing screens 18, which tend to cause the water from the spraying device 7 to form a film through which the air or gases from the pipe 5 must pass. The water will finally drip or fall into the trap 19, and as the trap is of the ordinary type the water will form a seal, as at 20, but as the flow of water will be constant there will always be a flow through the overflow-pipe 21, which may be carried away in any suitable manner. The seal, however, will always remain.

When the air or gases from the blower have passed through the screens 18 they will flow upwardly through the pipe 22 into the spreading funnel 23 which is situated adjacent to the bottom of a deodorizing tank 24. The bottom of the funnel 23 is provided with a perforated plate 25 (see Figs. 4 and 5), the perforations having fitted therein short nipples 26. When the air or gases enter and fill the said funnel 23, they will flow out through said nipples, whereby the flow of the air or gases will be divided into numerous small jets. Within the tank 24, and to a height sufficient to immerse the plate 25, I place a deodorizing element 27. Said element will be automatically supplied, as will hereinafter appear, a closable opening 28 being provided for filling purposes. When the deodorizing element is in place, the nipples 26 will be entirely immersed. As the air or gases issue from the said nipples, the same will bubble up through the deodorizer and the foul element in said gases will be destroyed. Any suitable deodorizer may be used, such as chlorid of lime (in saturated solution), diluted carbolic acid or the like. When the deodorizing solution has become useless through continued use, it may be drawn off through the pipe 29 and a fresh supply put in. When the air or gases have passed through the deodorizing solution and up into the body of the tank 24 they will be carried off through the pipe 30 and exhausted into the funnel 31 located in a washing tank 32. The funnel 31 is a duplicate of the funnel 23 in tank 24, and will therefore not be described in detail. Within the tank 32 water is contained, as at 33, the water preferably entering through a pipe 34 and flowing out through an outlet 35. The outlet 35 is of sufficient length to keep the water at a predetermined height sufficient to keep the bottom of the funnel 31 immersed. When the air or gases pass through the water, any residual odors will be washed therefrom, and the purified air or gases will issue through the exhaust passage 36 and can be conveyed away in suitable manner.

Fig. 1 illustrates the device as installed in a room and operates as follows: The foul air will be sucked into the blower 1 through the opening 3, and then into the saturating tank 6, where it will come in contact with water, as has been stated. The air will absorb as much of the water as it can and will then pass to the deodorizer, where the impure elements will be destroyed. The object of saturating the air with water is to prevent the air from passing to the deodorizer in too dry a state, in which case the air would absorb the deodorizer and carry some of it with it, but by saturating the air first, it cannot absorb any of the deodorizer, and consequently the deodorizer acts upon the impurities only. After having passed through the deodorizer the air is then passed through the water in tank 32, and any of the deodorizer gases that may be carried along with it will be absorbed by the water.

In the modified arrangement shown in Fig. 2, the blower 1 is placed between the saturator 6 and the deodorizer 24 and connected by the pipe 5'. In this arrangement the gases are drawn through the saturator 6 into the blower 1, and then forced through the tanks 24 and 32. If it is desired to connect the apparatus, for instance, to a kiln of a crematory (represented by A in Fig. 2), in which hot gases are created, the blower will draw the hot gases through the water in tank 6 and cool as well as saturate same, thus preventing the destruction of the blower as well as rendering the gases more susceptible to the deodorizing element.

In order to automatically control the supply of deodorizing liquid, I provide a valve-controlled inlet pipe 37 provided with a valve 38, a ball 39 actuating the valve through the agency of lever 40 (Figs. 6 and 7). When the deodorizing liquid is at the required height, as at 41 (Fig. 7), the valve 38 will be closed, thereby preventing the further flow of the said liquid, and when the liquid lowers, through use, the ball will fall, thus opening the valve again, as shown by dotted and dash lines 42 in Fig. 7. Liquid is supplied from any suitable source through a pipe 43.

Although the air or gases from the blower 1 will be under pressure, such pressure will not be sufficient to force the water-seal 20 from the trap 19, as the air will be carried away as rapidly as it is forced into the tank 6.

Having now described my invention, what I claim and desire to secure by Letters Patent is:

1. A deodorizing apparatus comprising a saturating tank, a deodorizing tank, and a washing tank, an air spreading funnel in said deodorizing tank provided with a perforated bottom, the perforations in said bottom being fitted with nipples, said deodorizing tank being provided with an inlet duct for the passage of a deodorizing liquid, a rotatable valve in said duct provided with an arm having attached thereto a float adapted to close said valve when the liquid in said deodorizing tank has attained a predetermined height above the perforated bottom in said funnel, said valve being adapted to be opened by the weight of said float when the liquid has fallen, the washing tank being also provided with a funnel provided with a perforated bottom, the perforations of which are fitted with nipples, a water supply for said washing tank, and means for keeping the water at a predetermined height above the perforated bottom of said funnel, an air inlet for said saturating tank, an outlet therefrom communicating with the funnel in the deodorizing tank, an outlet from said deodorizing tank communicating with the funnel in said washing tank, and an outlet from said washing tank.

2. A deodorizing apparatus, comprising a saturating tank, a deodorizing tank, and a washing tank, a water spraying device in said saturating tank, comprising a plurality of radially disposed perforated pipes out of alinement, a duct adapted to convey water to said pipes, obstructing screens in said saturating tank under said perforated pipes, a foul-air inlet under said screens, a trap under said saturating tank adapted to convey water therefrom and to form a seal against the escape of air therethrough, an air spreading funnel in said deodorizing tank provided with a perforated bottom, the perforations in said bottom being fitted with nipples, said deodorizing tank being provided with a duct for the passage of a deodorizing liquid, a rotatable valve in said duct provided with an arm having attached thereto a float adapted to close said valve when the liquid in said deodorizing tank has attained a predetermined height above the perforated bottom in said funnel, said valve being adapted to be opened by the weight of said float when the liquid has fallen, the washing tank being also provided with a funnel provided with a perforated bottom, the perforations of which are fitted with nipples, a water supply for said washing tank, and means for keeping the water at a predetermined height above the perforated bottom of said funnel, an air inlet for said saturating tank, an outlet therefrom communicating with the funnel in the deodorizing tank, an outlet from said deodorizing tank communicating with the funnel in said washing tank, and an outlet from said washing tank.

JAMES E. RALSTON.

Witnesses:
LILLIAN HARRIS,
EDWARD A. JARVIS.